Figure 1:
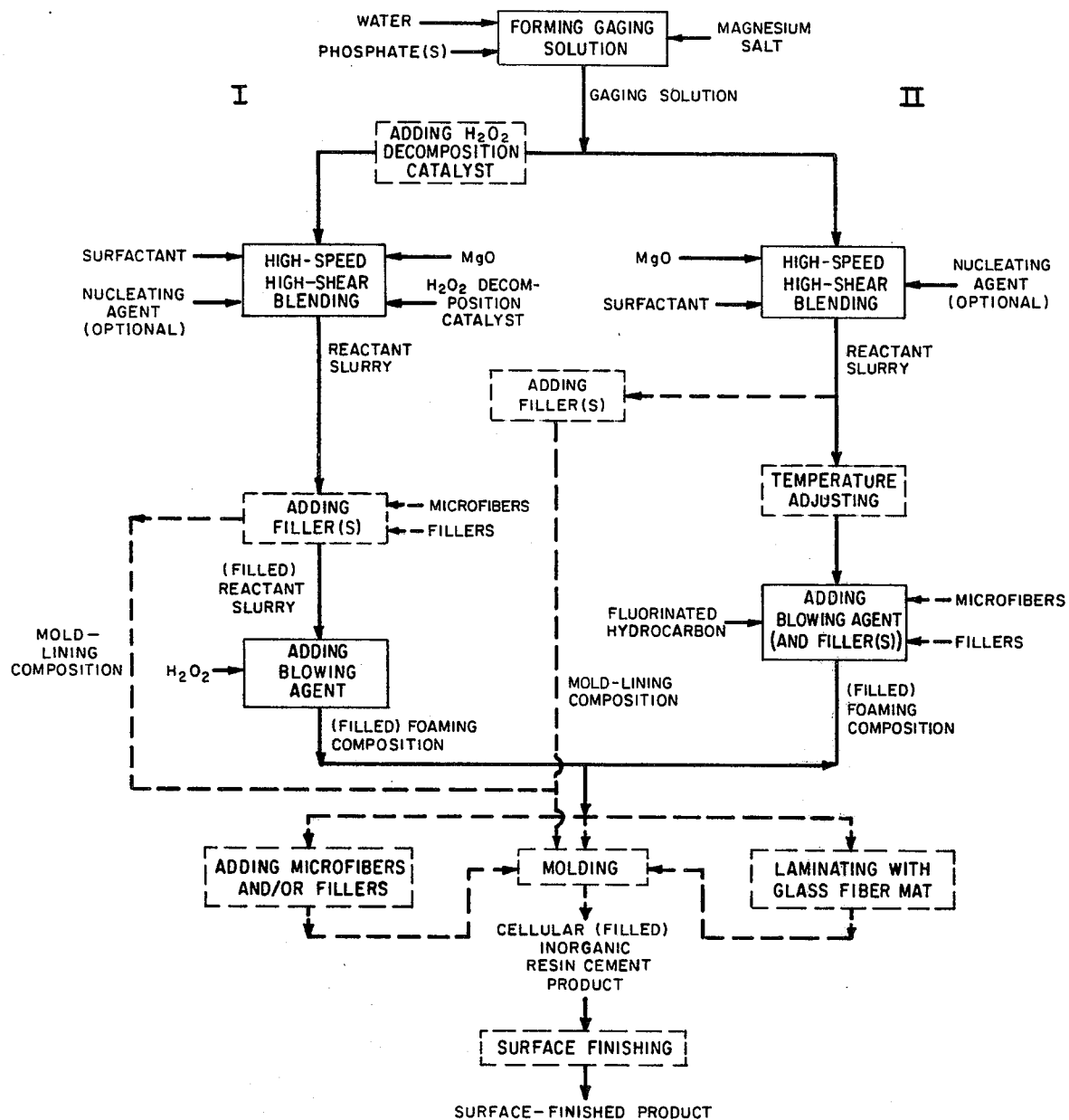

United States Patent [19]

Prior et al.

[11] 4,141,744

[45] Feb. 27, 1979

[54] CELLULAR INORGANIC RESIN CEMENTS, AND PROCESS AND COMPOSITIONS FOR FORMING THEM

[75] Inventors: William L. Prior, Newark, Ohio; Richard S. Lindstrom, Reading, Mass.

[73] Assignee: Arthur D. Little, Inc., Cambridge, Mass.

[21] Appl. No.: 857,310

[22] Filed: Dec. 5, 1977

Related U.S. Application Data

[63] Continuation-in-part of Ser. No. 706,885, Jul. 19, 1976, abandoned, and a continuation-in-part of Ser. No. 706,886, Jul. 19, 1976, abandoned.

[51] Int. Cl.² .......................... C04B 9/00; C04B 9/02; C04B 9/14
[52] U.S. Cl. ........................... 106/105; 106/106; 106/107
[58] Field of Search .................. 106/87, 105–107, 106/86

[56] References Cited

U.S. PATENT DOCUMENTS

| | | | |
|---|---|---|---|
| 1,946,077 | 2/1934 | Kauffmann | 106/87 |
| 3,320,077 | 5/1967 | Prior | 106/106 |

OTHER PUBLICATIONS

The Chemistry of Cement and Concrete, Lea et al., Ed. Arnold Pub., Ltd., London 1956, pp. 518–521.
The Condensed Chemical Dictionary, 8th Ed., Van Nostrand Reinhold Co., 1971, p. 396.

*Primary Examiner*—James Poer
*Attorney, Agent, or Firm*—Bessie A. Lepper

[57] ABSTRACT

Process and composition for forming cellular inorganic plastic cements of magnesium oxychlorides and magnesium oxysulfates. A water slurry containing a magnesium salt, magnesium oxide and a water-soluble phosphate is formed and to it are added an anionic water-repellent surfactant and a blowing agent capable of providing a gaseous component in the strongly alkaline environment either through decomposition or reaction or through vaporization. Inorganic filler material may be added to impart strength, the maximum flexural strength being attained when at least about one-half of the filler comprises microfibers. The resulting cellular product is nonflammable and exhibits essentially zero flame spread, zero smoke density and zero fuel contribution. The cellular products are further characterized as being formed of substantially uniformly sized cells and having densities over a wide range.

82 Claims, 2 Drawing Figures

CELLULAR INORGANIC RESIN CEMENTS, AND PROCESS AND COMPOSITIONS FOR FORMING THEM

This application is a continuation-in-part of our applications Ser. No. 706,885 and Ser. No. 706,886, both filed on July 19, 1976 and both now abandoned.

This invention relates to inorganic resin cements in cellular form which may optionally contain filler material, and to compositions and process for forming them. More particularly, this invention relates to inorganic resin cements which are either magnesium oxychloride or magnesium oxysulfate, which are in cellular form, which are water-resistant, nonhygroscopic and nonflammable, and which may have high flexural strength contributed by filler material.

The magnesium oxide cements, sometimes more generally referred to as inorganic resin or plastic cements, are known in the art. An improved process for the preparation of these inorganic resin cements (magnesium oxychloride and magnesium oxysulfate) is described in U.S. Pat. No. 3,320,077. These inorganic resin cements have found use in the manufacture of molded or cast structures such as construction panels, bricks, flooring and the like and as protective coatings.

Because of the strength, water-resistance, and nonflammability of these inorganic resin cements they offer the possibility of being used for a wide range of other applications, particularly in a less dense, cellular form. The prior art has disclosed various processes for foaming magnesium oxychloride and magnesium oxysulfate (see for example U.S. Pat. Nos. 2,598,980, 2,702,753, 3,119,704, 3,147,128, 3,522,069, 3,573,941, and 3,778,304). The foaming of refractory materials has also been disclosed (see for example U.S. Pat. No. 2,662,825). These prior art processes for foaming the inorganic cements have resulted in structures with non-uniform open and closed cells and densities ranging between about 10 and 30 pounds per cubic foot. Although some of these foamed products have found use as acoustical insulation, they do not possess the full range of properties which are attainable from a foamed inorganic plastic cement which has a substantially uniform cell structure and a controlled predetermined density ranging from about 6 to about 80 pounds per cubic foot. Such foams with at least partially closed cell structure have excellent thermal insulating properties, and can be designed to possess a desired degree of strength.

With the attainment, through the practice of this invention, of uniform cellular structure and controllable densities there arises many more potential uses for cellular inorganic resin cements. Among such potential uses may be listed bathroom fixtures, mass transportation seating, aircraft interiors, office machinery and appliance housings, arena and other public seating, interior panels for trucks and buses, furniture and the like. In these potential uses, unlike in such uses as insulation, construction panels, bricks, flooring, etc., the structural material must possess a certain degree of flexural strength. The unfilled magnesium oxide cements are relatively rigid and exhibit limited shear and tensile strength in directions in which there is little or no reinforcement to prevent the forming of cracks throughout the magnesium oxide cement matrix or to prevent the crazing of the surface of the matrix. Such cracking of the magnesium oxide cements begins as microcracks, and if the crack propagation is not halted, the microcracks may grow until the flexural, tensile and structural strengths of the item formed therefrom drop below an acceptable level. The same is true with surface crazing. Those magnesium oxide cements filled with finely divided particulate materials and/or standard-length glass fibers exhibit improved tensile and flexural strengths but they do not attain sufficient strength for many uses.

There is, of course, extensive prior art concerned with filled synthetic resins and plastics in solid and cellular form, e.g., filled polyesters and filled epoxies, which are now being extensively used for many different applications. This art dealing with filled synthetic resins is not, however, directly translatable or wholly applicable to the inorganic resin cements. It may be postulated that this fact is due to the fundamental differences between these inorganic resin cements and synthetic organic resins. One of the more important of these differences lies in the fact that what is normally referred to as the "modulus" (defined as the slope of the stress-strain curve) is considerably less for the polyester or epoxy resin alone than for the glass fibers (or other reinforcing materials). Thus for example, while the modulus for a polyester resin may range from between about 300,000 and 600,000, that for glass fibers is in the range of 10,000,000. The resin in a filled synthetic organic resin system therefore provides a matrix structure which is capable of some distortion to transfer stresses applied to the glass fiber filler which serves as reinforcement, taking up the stresses beyond the point at which the resin alone would experience stress failure.

In contrast to synthetic resins, the inorganic resin cements have high modulus values in the same range as the fillers. Typically, the modulus for an unfilled cellular magnesium oxide cement may be about 2,000,000. This in turn indicates that the magnesium oxide cement in an inorganic resin cement-glass fiber system can not distort under stress to transfer applied loads to long glass fibers without fracture and initial failure of the cement matrix. Therefore, as will be apparent from the detailed description and data presented below, it is not possible to substitute magnesium oxide cements for synthetic organic resins in the well-known organic resin-glass fiber systems; nor is it possible to use many of the accepted fillers for synthetic organic resins in forming filled cellular magnesium oxide cements and still achieve optimum or acceptable properties for many uses.

The fact that the magnesium oxide cements are water-resistant and nonflammable and that the raw material cost for their manufacture is less than for synthetic organic resins makes it desirable to be able to provide a cellular magnesium oxide cement with filler material which imparts good flexural strength, thus materially widening the range of applications for which these inorganic cements may be used, and making it possible to use them in place of the inflammable synthetic organic resins in a number of applications.

It is therefore a primary object of this invention to provide a process for forming a cellular inorganic resin cement, i.e., magnesium oxychloride or magnesium oxysulfate, having an essentially uniform cell structure comprising an essentially continuous solid phase. It is a further object to provide a process of the character described which is amenable to forming the cellular inorganic resins in place, to forming predetermined configurations in molds including compression molds, and to processing by such techniques as extrusion, pultrusion and filament winding. Another object is to provide a process of the character described which, in its various embodiments, makes possible the formation of inorganic resin cements which are of controlled, predetermined densities and strength, which are water-resistant, nonhygroscopic and nonflammable and which exhibit essentially zero flame spread, zero smoke density and zero fuel contribution. It is an additional object of this invention to provide a process of forming cellular inorganic resin cements which releases an emulsified blowing agent uniformly and rapidly throughout a high-solids concentration, low-viscosity, cement-forming reactive slurry before the cement gels, thus giving rise to an improved cellular material.

It is another primary object of this invention to provide a process for forming a filled cellular inorganic resin cement possessing, in addition to the properties of the unfilled material, high flexural, tensile and impact strengths.

Another primary object of this invention is to provide inorganic resin cement compositions which contain an emulsified blowing agent uniformly distributed therethrough, which release the blowing agent at a uniform and rapid rate before the resin cement gels, which have a high solids concentration but a relative low viscosity and which give rise to a cellular inorganic resin cement exhibiting improved properties. A further object is to provide inorganic resin cement compositions of the character described which contain no water in excess of that required in the reactions forming the cement and which are therefore particularly suitable for forming foamed-in-place cellular material, e.g., between insulation paneling, around electrical wiring and the like.

It is yet another primary object of this invention to provide compositions for forming filled cellular inorganic resin cements, particularly filled magnesium oxide cements, the compositions being used to manufacture filled inorganic resin cements possessing a combination of flexural, tensile and impact strengths. Still another object is to provide compositions of the character described which make it possible to use the filled inorganic resin cements in a number of applications, particularly where nonflammability is of importance.

A further primary object of this invention is to provide improved cellular inorganic resin cements having an essentially uniform cell structure and a controllable, predetermined density. It is another object to provide cellular inorganic resin cements of the character described which are essentially water-resistant, nonhygroscopic and nonflammable and which exhibit essentially zero flame spread, zero smoke density and zero fuel contribution. Still another object is to provide cellular inorganic resin cements which require no excess water removal and which therefore may be formed in place, e.g., between insulation paneling and around electrical wiring.

It is a further primary object of this invention to provide filled cellular inorganic resin cements possessing all of the properties of the unfilled cellular material and, in addition, possessing a combination of flexural strength, tensile strength and impact strength that permits the use of such filled cellular inorganic resin cements to replace filled synthetic organic resins in many applications. Yet a further object is to provide filled cellular inorganic resin cements suitable for constructing a wide range of items, including, but not limited to, bathroom fixtures, mass transportation, arena and other public seating, aircraft interiors, office machinery and appliance housings, interiors for trucks and buses, furniture and the like, panels, wallboard, structural elements, insulating and protective layers, etc. Other objects of the invention will in part be obvious and will in part be apparent hereinafter.

According to one aspect of this invention there is provided a process for forming a cellular inorganic resin cement, comprising the steps of forming a reactant water slurry of a magnesium salt selected from magnesium chloride hexahydrate and magnesium sulfate heptahydrate, a water-soluble phosphate and reactive magnesium oxide, the amount of the magnesium salt ranging from about 50% to about 75% by weight of the total weight of the water and magnesium salt, the molar ratio of the magnesium chloride hexahydrate to the magnesium oxide being between 1 to 3 and 1 to 8, and of the magnesium sulfate heptahydrate to the magnesium oxide being between 1 to 3 and 1 to 14, the slurry having a viscosity ranging between about 700 and 15,000 centipoises; blending into the slurry an anionic water-repellent surfactant; uniformly dispersing throughout the slurry a blowing agent, capable of providing a gaseous component either through decomposition or reaction or through vaporization at temperature below that at which the inorganic resin cement is cured, in an amount required to form the cellular inorganic resin cement with a predetermined density, thereby to provide a foaming composition capable of attaining the predetermined density and final cell structure before the foaming composition gels to form the cellular inorganic resin cement; and curing the foaming composition under conditions to retain essentially all of its water content. In specific embodiments of this process, one or more fillers are incoporated into the cellular inorganic resin cement, the character and amount of the fillers determining the tensile and flexural strengths of the cellular cements.

According to another aspect of this invention there is provided a composition for forming a cellular inorganic resin cement, comprising in combination (1) a reactant water slurry of a magnesium salt selected from magnesium chloride hexahydrate and magnesium sulfate heptahydrate, reactive magnesium oxide and at least one water-soluble phosphate, the slurry having a viscosity ranging between about 700 and 15,000 centipoises and being one in which the solids concentration of the magnesium salt ranges between about 50% and about 70% by weight of the total weight of the water and magnesium salt and in which the molar ratio of magnesium chloride hexahydrate to magnesium oxide ranges between 1 to 3 and 1 to 8 and of magnesium sulfate heptahydrate to magnesium oxide between 1 to 3 and 1 to 14; (2) an anionic, water-repellent surfactant present in the slurry in an amount between about 0.5% and about 3% by slurry weight; and (3) a blowing agent, capable of providing a gaseous component either through decomposition or reaction or through vaporization in the strongly alkaline environment of the slurry, uniformly dispersed throughout the slurry and present in an amount required to form the cellular inorganic resin cement with a predetermined density, thereby to provide a foaming composition capable of attaining the predetermined density and final cell structure before the foaming composition gels to form the cellular inorganic resin cement and from which essentially no water is removed upon curing. Preferred blowing agents are hydrogen peroxide which releases a gas upon decomposition, and fluorinated hydrocarbons which volatilize at a temperature below that at which the slurry sets up and gels, particularly trichlorofluoromethane which has a boiling point slightly above ambient temperature.

In specific embodiments of the composition aspect of this invention, the compositions also include one or more fillers in amounts up to about 40% by weight of the slurry. A preferred filler material added to the foaming composition comprises microfibers no greater than one-fourth inch in length. Other fillers, e.g., longer fibers, fiber mats and particulate materials may be added to, or combined with, the foaming composition in forming it into predetermined structural configurations.

According to yet another aspect of this invention, there is provided an article of manufacture which comprises a water-resistant, nonhygroscopic, nonflammable, cured inorganic resin cement structure in cellular form having essentially uniformly sized cells, a density ranging between about 5 and about 100 pounds per cubic foot and being further characterized as exhibiting essentially zero flame spread, zero smoke density and zero fuel contribution, the inorganic resin cement being the reaction product of reactive magnesium oxide and an aqueous, soluble phosphate-containing gaging solution of a magnesium salt selected from magnesium chloride hexahydrate and magnesium sulfate heptahydrate and having a concentration of the magnesium salt ranging between about 50% and about 75% by weight of the gaging solution, the molar ratio of magnesium chloride hexahydrate to magnesium oxide ranging between 1 to 3 and 1 to 8 and of magnesium sulfate heptahydrate to magnesium oxide ranging between 1 to 3 and 1 to 14, the reaction product being further characterized in that essentially all of the water of the gaging solution and the water of hydration of the magnesium salt are consumed in the reaction and contained in the reaction product.

In specific embodiments of this product aspect, the cellular structures include up to about 40% by slurry weight of one or more fillers. For cellular cement of maximum flexural and tensile strengths, at least one-half of the filler must comprise microfibers no greater than one-quarter inch in length. Other fillers, e.g., longer fibers, fiber mats and particulate materals may also be incorporated. By proper adjustment of the amount of each of the constituents making up the composition, it is possible to form a cellular product having essentially uniformly sized cells up to about 3mm in diameter, a density ranging from about 5 to 100 pounds per cubic foot and a tensile strength up to 100 pounds per square inch. With microfiber fillers flexural strengths up to 12,000 are attainable, the flexural strength being measured as modulus of rupture.

The invention accordingly comprises the several steps and the relation of one or more of such steps with respect to each of the others, the compositions possessing the features, properties and the relation of constituents and the article which possesses the characteristics, properties and relation of elements, which are exemplified in the following detailed disclosure, and the scope of the invention will be indicated in the claims.

Figure 2:
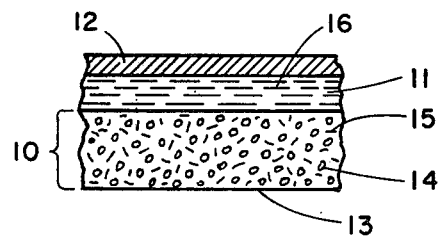

For a fuller understanding of the nature and objects of the invention, reference should be had to the following detailed description taken in connection with the accompanying drawings in which FIG. 1 is a schematic flow diagram of the process of this invention; and FIG. 2 is a cross-section of a cellular product formed.

The process of this invention is diagrammed in FIG. 1. This diagram illustrates two foaming techniques (designated I and II) by which a gaseous component capable of expanding the slurry is introduced therein such that it sets up in cellular form. Technique I involves the use of a blowing agent which develops the required gaseous component through either decomposition or reaction of the blowing agent in the alkaline environment of the reaction slurry. In FIG. 1, this type of blowing agent is represented by hydrogen peroxide which decomposes. Technique II uses a liquid blowing agent which vaporizes to provide the gaseous component under the alkaline environment at a temperature below that at which the slurry sets up; this type of blowing agent is illustrated by the use of a fluorinated hydrocarbon.

Since the formation of the inorganic resin cement composition of this invention is, up through the point of reactant slurry preparation, preferably carried out in accordance with the teaching of U.S. Pat. No. 3,320,077, it will be convenient first to review the preparation of the slurry and the constituents forming it. Either hydrogen peroxide or a fluorinated hydrocarbon will be used to illustrate the blowing agent. Therefore, in accordance with the teachings of U.S. Pat. No. 3,320,077, up to the point of adding the surfactant and blowing agent (along with any nucleating agent and filler if used), it is preferable to use high shear blending in mixing the magnesium oxide into the gaging solution of magnesium salt and water-soluble phosphate additive. Therefore the process for the forming of the foaming composition comprises the steps described below. The components, along with the ranges in which they may be used, will be identified in this process description.

The magnesium salt used may be either magnesium chloride used as the hexahydrate, $MgCl_2 \cdot 6H_2O$, or magnesium sulfate used as the heptahydrate, $MgSO_4 \cdot 7H_2O$. The first step of the process is the formation of a solution of the magnesium salt in water. This solution, known as the gaging solution, may be supersaturated with respect to the magnesium salt and is preferably formed to contain a small amount of water-soluble phosphate which may be added prior to the addition of the magnesium salt to the water as is preferable in the case of the use of sodium hexametaphosphate, or subsequent to the addition of the salt as may be done in the use of phosphoric acid.

The role of the water-soluble phosphate is probably a dual one, i.e., to improve the wet strength of the foam formed and to control the viscosity of the foaming composition. Among the water-soluble phosphates which may be used are phosphoric acids, polyphosphates and particularly so-called sodium hexametaphosphate, various alkali metal mono- and dibasic phosphates, ammonium phosphates and the like. The term "hexametaphosphate" is used hereinafter, as is customary, to include a large number of glassy chain phosphates wherein the molar ratio of $Na_2O/P_2O_5$ may range from about one to about 1.5. The amount of the water-soluble phosphate used may range up to about 6% by weight of the magnesium oxide added while a preferable range is between about 1% and 4%. As will be shown, each of the components in the composition has some influence on the final physical properties of the foamed product and in choosing an optimum composition for any one set of properties it is necessary to take the effects of each into account.

The data in Table 1 illustrate the effect on foam density, viscosity of foaming composition, cell structure and product density of the presence of a water-soluble phosphate in a foam composition in which hydrogen peroxide is used as the liquid blowing agent. In forming the compositions of Table 1, the concentration of $MgCl_2.6H_2O$ in the water was about 70% by weight, the molar ratio of $MgCl_2.6H_2O$ to MgO was 1 to 5, 2% by slurry weight of zinc stearate was used as the surfactant, 4% (30% concentration) by slurry weight of hydrogen peroxide was used as the blowing agent, and 16% by slurry weight of ¼-inch water-bonded milled fiber glass was added as an inorganic reinforcing material. The phosphate was sodium hexametaphosphate. The foams were cured under ambient conditions.

In preparing the compositions of the examples of Table 1, as well as of all the remaining examples given, the gaging solution was first formed by adding the magnesium salt to the water. If sodium hexametaphosphate was used it was added before the magnesium salt; if phosphoric acid was used it could be added after the magnesium salt. All mixing was carried out in a Waring blender which provided high shear and good blending. The hydrogen peroxide decomposition catalyst, if used, was blended into the gaging solution and then the MgO was added slowly to deflocculate it and thoroughly disperse it for complete reaction with the magnesium salt. To this slurry were then added the surfactant and the nucleating agent and filler. Finally, the hydrogen peroxide was thoroughly blended in. The tensile strengths of the cellular products of Table 1, and of all examples hereinafter presented, were determined by the procedure of ASM Test No. D638. As a general rule, flexural strength can be considered to be about twice that of the tensile strength.

Table 1
Effect of Water-Soluble Phosphate on Cellular Density, Viscosity and Cell Structure Hydrogen Peroxide Blowing Agent

| % Phosphate by MgO Weight | % $KMnO_4$* by Slurry Weight | Viscosity Cps** | Properties of Cellular Product | | |
|---|---|---|---|---|---|
| | | | Cellular Density lbs/ft³ | Cell Structure | Tensile Strength psi |
| 0.0 | 0.00 | 15,000 | 49.3 | fine | 342 |
| 0.0 | 0.005 | 12,000 | 31.9 | fine | 160 |
| 1.0 | 0.005 | 1,500 | 24.2 | fine | 160 |

*Solids basis
**Foaming Composition

The data in Table 2 illustrate the effect on cell structure and foam density of the presence of a water-soluble phosphate in the foam composition using a liquid hydrocarbon as the blowing agent. In forming the compositions of Table 2, the concentration of $MgCl_2.6H_2O$ and the molar ratio of $MgCl_2.6H_2O$ to MgO were the same as used in obtaining the data of Table 1. Two percent by slurry weight of ammonium stearate was substituted for the zinc stearate, 4% by slurry weight of $CCl_3F$ was used as the blowing agent and no filler was included.

Table 2
Effect of Water-Soluble Phosphate on Cellular Density and Cell Structure Liquid Hydrocarbon Blowing Agent

| % Phosphate by MgO Weight | Cell Structure | Cellular Density lbs/ft³ |
|---|---|---|
| 0.0 | nonfoaming | 80 – 85 |
| 1.0 | ultrafine | 6.0 |
| 2.0 | ultrafine | 8.0 – 9.5 |

The data of Table 1 illustrate the marked effect on viscosity of the foaming composition, and hence on final cellular density, brought about by the addition of the phosphate. The data in Table 2 show how the phosphate enables the composition to be foamed and then to possess sufficient wet strength to set up in a permanent foam form.

In preparing the gaging solution, the weight concentration of the magnesium salt in the water solution formed should preferably range between about 60% and 75% based on the weight of the hydrated salts, although concentrations as low as about 50% may be used for those applications wherein increased cell size and some variations in cell structure can be tolerated. It will be seen from Tables 3 and 4 that concentrations of the magnesium salt in the range between about 50% and 55% give rise to the formation of medium-sized cells, e.g., cells having diameters between about 1.25 and 3 mm. For some uses, a foam product of this nature can be used where lower tensile strengths can be tolerated. In formulating the compositions to obtain the data of Tables 3 and 4, the reactive slurry had a ratio of $MgCl_2.6H_2O$ to MgO of 1 to 5. The reactive slurries of Table 3 contained by slurry weight 4% (30% concentration) hydrogen peroxide, 0.005% $KMnO_4$ as a hydrogen peroxide decomposition catalyst, 2% zinc stearate as surfactant, and 16% ¼-inch bonded milled glass fibers as microfiber fillers. The foams were cured under ambient conditions. The reactive slurries of Table 4 contained 4% by weight $CCl_3F$ and 2% ammonium stearate as surfactant. These foams contained no filler and were also cured at room temperature.

Table 3
Effect of $MgCl_2.6H_2O$ Concentration on Density, Tensile Strength and Cell Structure Hydrogen Peroxide Blowing Agent

| % Conc. $MgCl_2.6H_2O$ in Gaging Solution* | Properties of Cellular Structure | | |
|---|---|---|---|
| | Density lbs/ft³ | Tensile Strength psi | Cell Structure** |
| 45.0 | 17.6 | 18 | large |
| 50.0 | 18.9 | 36 | medium |
| 55.0 | 20.3 | 48 | medium |
| 60.0 | 22.4 | 76 | fine |
| 65.0 | 23.0 | 110 | fine |
| 70.0 | 23.6 | 136 | fine |
| 75.0 | 23.9 | 148 | fine |

*Gaging solution formed of $MgCl_2.6H_2O$ and water
**large -- diameters > 3mm
medium -- diameters 3–1.25mm
fine -- diameters < 1.25mm Table 4
Effect of $MgCl_2.6H_2O$ Concentration on Cell Size and Uniformity Liquid Hydrocarbon Blowing Agent

| % Conc. $MgCl_2.6H_2O$ in Gaging Solution* | Average Cell Size mm²** | Cell Uniformity Structure+ | Density lbs/ft³ |
|---|---|---|---|
| 45 | oversize | N, W, O | 9.00 |
| 50 | oversize | N, W, O | 6.50 |
| 55 | 2.05 | N, W, O | 6.50 |
| 60 | 1.24 | U, S, C | 6.10 |
| 65 | 0.53 | U, S, C | 5.74 |
| 70 | 0.64 | U, S, C | 5.90 |
| 75 | 0.46 | U, S, C | 6.40 |

*Gaing solution formed of $MgCl_2.H_2O$ and water
**Measured area of cut cell
+N - nonuniform; W - weak; O - open;
U - uniform; S - strong; C - closed.

The magnesium oxide used may be either natural or synthetic, the synthetic being preferred due to its platelike structure, uniform consistency and absence of trace amounts of impurities which may discolor the foam. A preferred form of magnesium oxide is one which has an iodine number between 15 and 60, a particle size distribution such that 50% is sized less than 0.2 to 0.3 micron and substantially all is sized less than 20 microns, a hexagonal plate crystal system and a crystal size between about 0.02 and 0.35 micron. Magnesium oxide with these characteristics is generally considered to be active and it will react with the magnesium salt used.

The amount of magnesium oxide depends upon the magnesium salt used to form the inorganic plastic cement. If magnesium chloride is used, then the molar ratio of $MgCl_2.6H_2O$ to $MgO$ is between about 1 to 3 and about 1 to 8; while if $MgSO_4.7H_2O$ is used the molar ratio is between about 1 to 3 and about 1 to 14.

The magnesium oxide is added to the magnesium salt solution containing the phosphate. It is preferable that the magnesium oxide be added slowly and that the slurry during formation be processed in a high-shear blender (e.g., a Daymax or Meyers in commercial production) to deflocculate and thoroughly disperse the magnesium oxide particles. The use of very fine magnesium oxide and its thorough dispersion for reaction with the magnesium salt result in a low viscosity slurry and hence in a less dense foam. Thus the quality of the magnesium oxide is an important contributing factor to foam density.

In forming a foam of the character described, it is necessary to use what may be termed an "emulsified" surfactant. This surfactant exercises some control over the cell structure and size as well as the density of the foamed product. It is thought that the particular type of surfactant used is at least partially responsible for the fact that a portion of the cells are closed, making it possible to entrap in the closed cells the decomposition products of the blowing agent or the vaporized blowing agent.

The surfactant is added to the water slurry of phosphate, magnesium salt and magnesium oxide. The addition of the surfactant should be done in such a manner as to ensure its uniform dispersion throughout the slurry. This is preferably accomplished in a high-shear mixing device. The surfactant should be one which is water repellent and anionic in character. Such suitable surfactants include, but are not limited to, oleic acid, stearic acid, the salts of stearic acid such as ammonium, sodium, magnesium, zinc and calcium stearate, dimethylpolysiloxane, anionic silicone resin emulsions, mixtures thereof, and the like. The preferred surfactants are stearic acid and the inorganic salts thereof.

A number of compositions were formulated using various anionic, water-repellent surfactants with varying amounts of hydrogen peroxide, decomposition catalyst, and reinforcing filler material. The basic composition used was a 70% gaging solution, a molar ratio of $MgCl_2.6H_2O$ to $MgO$ of 1 to 5 and 1% by slurry weight of sodium hexametaphosphate. The foams were cured under ambient conditions.

The densities and tensile strengths of the resulting foamed products are given in Table 5. All of the foamed products of the Table 5 compositions had acceptably fine cell structures.

The effect of the presence of the surfactant on foam product properties is further illustrated in the examples of Table 6. The same basic slurry was used as in the examples given in Table 5, except that 0.005% $KMnO_4$, 4% $H_2O_2$ (30% concentration) and 16% filler by slurry weight were used. Zinc stearate in varying amounts was used as the surfactant.

From the data in Tables 5 and 6 it will be seen that at least about 1% by slurry weight of the surfactant is required to give a fine cell structure. If, however, less uniform cell structures can be tolerated, e.g., in some insulations and the like, then as little as 0.5% by slurry weight of surfactant may be used. As will be apparent from the examples of Tables 5 and 6, increasing the amount of surfactant from 2% to 3% may bring about a small increase in density and tensile strength. However, although amounts of surfactant greater than 3% by weight may be added, there is no marked advantage to be gained as far as the properties of the foamed product are concerned in using much greater than about 3% surfactant.

Table 5

Effective of Selected Surfactants on Density and Strength of Cellular Products Hydrogen Peroxide Blowing Agent

| Surfactant | Composition in % by Slurry Wt. | | | | Properties Cellular Product | |
|---|---|---|---|---|---|---|
| | Surfactant | $H_2O_2$* | $KMnO_4$ | Filler** | Density lbs/ft$^3$ | Tensile Strength psi |
| Stearic acid | 3 | 4 | 0 | 4 | 37.3 | 80 |
| Ammonium stearate | 2 | 4 | 0.005 | 6 | 23.9 | 90 |
| | 3 | 4 | 0 | 4 | 37.3 | 142 |
| Calcium Stearate | 2 | 5 | 0 | 4 | 34.6 | 120 |
| | 3 | 4 | 0 | 4 | 35.2 | 130 |
| Sodium Stearate | 3 | 4 | 0.005 | 5 | 23.9 | 90 |

*30% concentration
**⅛ inch water-bonded, milled glass fibers.

Table 6

Effect of Amount of Surfactant on Properties of Cellular Product Hydrogen Peroxide Blowing Agent

| % Surfactant by Slurry wt. | Properties of Cellular Product | | |
|---|---|---|---|
| | Density lb/ft$^3$ | Tensile Strength psi | Cell Structure |
| 0.0 | 120 | — | no foaming |
| 0.5 | 28.3 | 134 | nonuniform open and closed cells |
| 1.0 | 24.5 | 168 | relatively fine, uniform cells |
| 1.5 | 24.8 | 142 | fine uniform cells |
| 2.0 | 24.2 | 160 | fine uniform cells |

Likewise, a number of compositions were made up, using $CCl_3F$ as a liquid blowing agent. Each of the compositions incorporated a different one of the above-listed surfactants in an amount equal to 2% or 3% by slurry weight. The compositions contained $MgCl_2.6H_2O$ and $MgO$ in a molar ratio of 1 to 5, 1% by slurry weight of sodium hexametaphosphate and 4% by slurry weight of the $CCl_3F$. The foaming efficiency was rated good and the resulting foamed inorganic resin cements had densities ranging between 5.9 and 8.6 pounds per cubic foot.

When similar compositions were made up using nonionic surfactants such as a sorbitan monostearate, a cationic surfactant such as a quaternary organosilicone or a nonwater-repellent anionic such as an alkyl sulfonate, the foaming efficiency was not acceptable and the foam collapsed.

In some cases it may be desirable to add a small amount, e.g., up to about 0.5% by slurry weight of a nucleating agent, e.g., a silicone oil, to assist the transportation of the blowing agent molecule from solution in the slurry into the gas phase. When the anionic surfactant itself is a silicone resin emulsion (e.g., a surfactant sold under the tradename of RE-230 Silicone Emulsion by Union Carbide Company) it will not be necessary to add a separate nucleating agent. If used, the nucleating agent is added along with or subsequent to the addition of the surfactant to the slurry in an amount up to about 0.5% by slurry weight.

The reactive aqueous slurry thus formed and containing the water-soluble phosphate, magnesium salt, magnesium oxide, surfactant and nucleating agent, if used, should have a viscosity ranging between about 700 and 15,000 centipoises with a preferred range being between about 700 and 2500 centipoises. All viscosity values herein mentioned are determined at 80° F.±2° F. using a Brookfield viscometer with a Number 5 spindel at 20 rpm. It is preferable that the slurry at this stage prior to the addition of the blowing agent be nonthixotropic, particularly if it is desired to obtain minimum densities in the final product.

As will be seen in the flow diagram of FIG. 1, if one or more fillers are added, the point at which the blowing agent is added depends upon the nature of the blowing agent. Thus where the blowing agent is one, such as hydrogen peroxide, which reacts or decomposes in the alkaline environment of the reactant slurry, it is added after the filler or fillers which are to be blended into the foaming composition are introduced. Where the blowing agent is a liquid which vaporizes at or below the curing temperature of the reactant slurry, then it is preferable to blend the blowing agent as a liquid along with the filler or fillers into the reactant slurry at a temperature below the boiling point of the blowing agent. The process of this invention is further detailed using first hydrogen peroxide and then trichlorofluoromethane as the blowing agents.

In using hydrogen peroxide it is usually preferable in order to achieve better control of the physical properties of the final cellular material to add a decomposition catalyst. If such a catalyst is used, it may be added, along with the surfactant and MgO, to the slurry in the form of a concentrated water solution and thoroughly blended in it. Alternatively, it may be added as a solid to the water used in forming the gaging solution prior to the addition of the magnesium salt, or it may be added as an aqueous solution to the gaging solution. (In FIG. 1 alternate or optional steps are indicated in dotted lines.) If the foaming composition without the hydrogen peroxide is to be stored for a period of time, then it will be desirable to add the catalyst in aqueous solution just prior to the addition of the hydrogen peroxide. The use of such a decomposition catalyst exercises some control over the rapidity with which the foam forms and, more importantly, over the density and cell structure of the final product. In general, the use of a hydrogen peroxide decomposition catalyst increases the rate at which the decomposition takes place and hence the rate of foaming. This in turn gives rise to lower densities, lower tensile strengths and smaller cell sizes. This may be seen in Table 1 by comparing the properties of the final products of the first two examples given in that table. It may also be seen from the examples given in Table 7. In formulating the compositions which gave rise to the foamed products of the examples in Table 7, a gaging solution of 70% $MgCl_2.6H_2O$ was used and the molar ratio of $MgCl_2.6H_2O$ to MgO was 1 to 5. The slurry contained 1% by weight sodium hexametaphosphate, 5% by weight ¼-inch milled glass fibers and 3% by weight of either calcium or sodium stearate. The hydrogen peroxide was added as a 30% aqueous solution.

Table 7
Effect of Amount of $H_2O_2$ Decomposition Catalyst on Properties of Cellular Product

| $H_2O_2$* by Slurry Wt. | % $KMnO_4$** by Slurry Wt. | Properties of Cellular Product | | |
|---|---|---|---|---|
| | | Density lb/ft$^3$ | Tensile Strength psi | Cell Structure |
| 4 | 0 | 41.2 | 126 | fine |
| 4 | 0.005 | 23.7 | 64 | fine |
| 4 | 0.005 | 24.9 | 62 | fine |
| 0.8 | 0.05 | 41.2 | 240 | fine |

*30% concentration
**Solids basis; added as concentrated water solution.

The data in Table 7 also show that the use of a smaller amount of hydrogen peroxide and greater amount of potassium permanganate can produce a foamed product with a good density, a marked increase in tensile strength and a fine cell structure. Thus by varying the amount of the hydrogen peroxide decomposition catalyst and its weight ratio to the hydrogen peroxide used, it is possible to exercise control on the density, tensile strength and cell structure of the final product.

Any compound known to catalyze the decomposition of hydrogen peroxide (e.g., compounds containing iron, cobalt, manganese, nickel and the like) may be used and it may be added in an amount up to about 0.5% of the slurry weight. A preferred catalyst for this purpose is potassium permanganate.

Once the slurry with the desired viscosity has been formed and thoroughly mixed, it is in condition to have the inorganic filler material added. Finally, the hydrogen peroxide is thoroughly blended throughout the slurry. The addition of the hydrogen peroxide is carried out with the slurry under ambient conditions. The decomposition of hydrogen peroxide to gaseous water and oxygen is, of course, exothermic.

The hydrogen peroxide blowing agent is preferably used in the form of a water solution, which may have a relatively wide concentration range. A preferable concentration is about 30% since this is a commercially available and stable form of hydrogen peroxide. The amount of hydrogen peroxide used has a direct bearing on the density and tensile strength of the final product as shown in the examples of Table 8. In formulating these compositions for foaming, a 70% gaging solution of $MgCl_2.6H_2O$ was used and the molar ratio of $MgCl_2.6H_2O$ to MgO was 1 to 5. The slurry contained 1% by weight of a surfactant, 0.007% by weight $KMnO_4$, 10% by weight of ⅛-inch milled glass fibers, 2% by weight zinc stearate and 0.1% by weight of a nucleating agent in the form of a silicone resin emulsion (sold as RE-230 by Union Carbide Company). The foamed products were cured under ambient conditions.

Table 8
Effect of Amount of $H_2O_2$ Blowing Agent on Properties of Cellular Product

| $H_2O_2$* by Slurry Wt. | Phosphate** | Properties of Cellular Product | |
|---|---|---|---|
| | | Density lb/ft$^3$ | Tensile Strength psi |
| 2. | SHMP | 37.8 | 256 |
| 2.5 | SHMP | 33.5 | 238 |
| 3.0 | SHMP | 28.2 | 182 |
| 4.0 | SHMP | 22.5 | 140 |
| 2.5 | PA | 38.3 | 256 |

Table 8-continued

Effect of Amount of $H_2O_2$ Blowing Agent on Properties of Cellular Product

| $H_2O_2$* by Slurry Wt. | Phosphate** | Properties of Cellular Product | |
|---|---|---|---|
| | | Density lb/ft³ | Tensile Strength psi |
| 4.0 | PA | 33.5 | 210 |

*30% concentration
**SHMP - sodium hexametaphosphate;
PA - phosphoric acid.

The data of the examples of Table 8 illustrate that for any one system, increasing the amount of hydrogen peroxide decreases the density and tensile strength of the foamed product. The amount of hydrogen peroxide of 30% concentration may range from about 0.25% to about 8% by slurry weight to achieve a density range from about 5 to about 100 pounds per cubic foot. Since aqueous solutions of hydrogen peroxide of concentrations other than 30% may be used, this range of hydrogen peroxide is conveniently expressed on a 100% basis as being from about 0.75% to about 2.5% by slurry weight.

Other blowing agents which may be used in place of hydrogen peroxide include, but are not limited to, toluene-(4-sulfonyl hydrazide) and 4-4'-oxybis(benzene sulfonyl hydrazide). Such blowing agents must be capable of developing the required amount of gaseous products in an alkaline environment at a temperature no greater than about 125° C.

For convenience of processing the foaming composition when the cellular inorganic resin cement is formed using a liquid blowing agent which vaporizes to provide the required gas, it is preferable to employ a blowing agent having a boiling point which is at least slightly above ambient temperature. The use of such a blowing agent eliminates or minimizes the need for cooling of the reactant slurry prior to adding the blowing agent. If the blowing agent has a boiling point just above ambient temperature, then the foam will form and the resin cement will gel at essentially ambient temperature. If the blowing agent has a boiling point above that temperature reached by the foaming composition in the final blending, then it will be necessary to apply some heat to form the cellular material with the desired cell structure and density. Thus once the slurry with the desired viscosity has been formed and thoroughly mixed, it may be necessary to adjust its temperature prior to adding the blowing agent. The slurry temperature should be at least a few degrees (e.g., about 4 to 5° F.) below the boiling point of the blowing agent. This permits the thorough dispersion of the blowing agent as a liquid throughout the slurry before any appreciable volume increase takes place.

A preferred blowing agent of this type is a fluorinated hydrocarbon liquid such as $CCl_3F$ (b.p. 74.9° F.). Under normal conditions, the slurry, after mixing is completed, will be a few degrees above 70° F. If it is then cooled to 70° F., the $CCl_3F$ may be added. It is important that the blowing agent be thoroughly and uniformly blended into the slurry to ensure the formation of uniformly-sized cells. As the mixture is thoroughly blended to disperse the blowing agent, the temperature will rise to a point where the blowing agent reaches its boiling point with resultant bubble formation and subsequent bubble growth resulting in a marked increase in volume. When the foaming composition is formed in the manner described, the foamed slurry does not gel before it reaches the predetermined density and cell structure desired of the final cellular inorganic resin cement. Moreover, the foam possesses sufficient green strength stability so that it does not collapse before the plastic cement sets and can be cured. These performance characteristics of the foam are, of course, essential and they are inherent in the process and composition of this invention.

Final foam density is primarily controlled by the amount of blowing agent added. However, the surfactant used, the viscosity of the slurry and the ratio of magnesium salt to magnesium oxide, as well as the solids concentration of the gaging solution in conjunction with the amount of blowing agent, also exert some influence on the density of the foamed inorganic plastic cement formed. Table 9 presents data which are illustrative of the effect of the amount of blowing agent used. In obtaining the data of Table 9, a slurry was formed in which the molar ratio of $MgCl_2.6H_2O$ to MgO was 1 to 5, the concentration of the gaging solution was 70%, 1% by MgO weight of sodium hexametaphosphate was added as the water-soluble phosphate, 2% by slurry weight of ammonium stearate was used as the surfactant and 0.5% by slurry weight of silicone oil was added as a nucleating agent. The blowing agent was $CCl_3F$. The slurry had a viscosity of about 700 to 2500 centipoises.

Table 9

Effect of Blowing Agent on Cellular Density

| % Blowing Agent by Slurry Weight | Cellular Density lbs/ft³ |
|---|---|
| 0.75 | 40.0 |
| 1.0 | 30.0 |
| 1.5 | 25.0 |
| 2.5 | 15.0 |
| 4.0 | 6.0 |

From the data of Table 9, it will be seen that for the particular slurry composition chosen, the amount of blowing agent ranged between about 0.75% and about 4% by slurry weight to obtain a density range of 6 to 40 pounds per cubic foot. However, for other compositions and other slurry viscosities, the amount of liquid blowing agent which vaporizes to provide gas may vary between about 0.5% and about 8% by slurry weight.

In addition to the fluorinated hydrocarbons, such liquid blowing agents as pentane, hexane, heptane and the like may be used. In applications where essentially complete nonflammability is required, the fluorinated hydrocarbons are preferrd.

Once the foaming composition is formed it may be transferred into any appropriate mold for final gelling, setting and curing with or without added heat and/or pressure. The mold surface may be coated with a suitable release coating such as a fluoropolymer, a silicone oil or a wax. The term "mold" is used to include any cavity into which the foaming composition is introduced for gelling, setting up and curing; and hence it encompasses paneling and the like suitable for containing a foamed-in-place inorganic resin cement. Thus, for example, foamed insulation may be formed in situ or electrical connections or wiring may be embedded in the cellular material for fireproofing. The foaming composition may be used in very low or low-pressure matched-die molding, in pultrusion, in extrusion or in filament winding. The foaming composition may also be compression molded into construction panels, brick and the like in accordance with accepted techniques of compression molding.

Normally in commercial practice it will be desirable to effect curing by heating. The heat may be supplied in the form of infrared radiation, hot gases, e.g., air, steam, and the like. The temperature at which this curing is carried out should be that which raises the temperature of the foamed structure to no greater than about 250° F. or about 125° C. In curing, the temperature of the inorganic resin cement should be maintained below that level at which any appreciable dehydration of the cement takes place.

As will be seen from FIG. 1, the addition of a filler component constituting one or more fillers is an optional step. Further, as previously noted, if maximum flexural strength is desired in the cellular product, then at least one-half of the filler component must comprise microfibers. As used hereinafter and in the claims, the term "filler component" refers to all filler materials, whether microfibers, long glass fibers, particulate material, glass mats and the like, which may be incorporated into the cellular product. The term "filler" will be used to designate all materials, other than microfibers, making up the filler component.

As previously discussed, the role of at least a portion of the filler component in the filled magnesium oxide cements is apparently other than that of a reinforcing material. The microfibers form this portion of the filler component. Due to the character of the magnesium oxide cements (high modulus and relatively low flexural strength) these cements may in themselves serve partly in the role of a filler, although they are not included within the meaning of the terms "filler" or "filler component" as used herein. This in turn means that the added filler component must be of such a nature as to contribute substantial flexural strength as well as tensile and impact strengths in those cases where high flexural strengths are required. Because of this, at least a portion of the filler component must be nonplanar, i.e., it cannot be only a material such as long glass fibers, or relatively large platelets or fine particulate material which, in effect, provides for two-dimensional reinforcement.

This portion of the filler component which contributes a substantial increase in flexural (and tensile) strength must, contrary to prior art practice, be so sized and configured to provide added strength in a multiplicity of directions, e.g., at least three directions which may, for simplicity, be thought of as width, length and depth. Hence, this portion of the filler component is termed "multidirectional" for convenience to designate it as being nonplanar. In order to have a filler component which meets these requirements, it is necessary that the filler component contain sufficient short fibers to permit a sufficient amount of the filler component to be multidirectionally oriented. In general, these short fibers, hereinafter termed "microfibers" or "microfibrous filler," should not be longer than about one-fourth inch. These microfibers serving as all or a portion of the filler component and being multidirectionally oriented may serve in the dual role of filler and matrix, thus forming a filled cellular magnesium oxide cement in which the roles of matrix and filler are not sharply delineated.

In choosing the filler component it is preferable that a major portion (over 50%) of the filler component used is a microfiber material; and fibers ranging in length between about 1/32 inch and ¼ inch are preferred. In general, the finer the size of the microfibrous filler the more of it may be added and still have a foaming composition capable of setting up into a desirable structure. Moreover, the finer the cell structure of the cellular inorganic resin, the shorter the microfibers should be.

The preferred microfibers are those formed of glass, that is the microfibrous filler is made up of short lengths of fiber glass. So-called "milled" glass fibers are particularly good since the milling process serves to separate the short glass fibers into separate entities which can be properly oriented through the inorganic resin cement. Milling also produces some small particulate pieces of glass, but sufficient individual fibers remain to achieve the primary purpose of the microfiber fillers. The microfibers may have aspect ratios ranging from about 5 to 1500. Exemplary of suitable fiber glass fillers are those having a length from about 1/32 to about ¼ inch and a diameter of about 0.3 mils giving aspect ratios from about 100 to 850.

The glass fibers used may be surface treated in accordance with known techniques which are fully described in the literature. (See, for example, "The Manufacturing Technology of Continuous Fibres" by K. L. Lowenstein, Elsevier Scientific Publishing Company, New York, 1973, pp 191-233.) However, surface treatment of the glass fibers is not necessary as is seen from the data in Table 10 below.

Fibers other than those formed from glass which meet the specifications set forth for the microfibers may also be used. Such fibers include, but are not limited to, those formed of mineral slag, of such naturally occurring material as wollastonite, asbestos, and the like.

Asbestos mine tailings used as a reinforcing filler in accordance with this invention are in a particulate form having short asbestos fibers attached thereto, the fibers making up about 1-2% by weight of the tailings. This material is a residual product of the asbestos mining process wherein asbestos fiber is removed from crushed asbestos-containing rock. The crushed rock, after essentially all of the long asbestos fiber has been removed from it, is referred to as "asbestos mine tailings." This material has been of no practical value and has normally been discarded; its use in accordance with this invention converts it to a valuable component of a unique construction material.

Although asbestos mine tailings have no readily apparent characteristics which would appear to account for their effectiveness as reinforcing fillers for inorganic resin cements, such characteristics become immediately apparent when these materials are viewed through a microscope. At about 30 magnification it will be seen that a substantial number of the individual particles making up the asbestos mine tailings have short fibers attached. These attached fibers are thought to provide multidirectional reinforcement to the cellular inorganic resin cements in much the same manner as glass or other mineral microfibers described herein.

Thus, the asbestos mine tailings exhibit the desirable characteristics of both particulate fillers and multidirectionally oriented microfiber fillers. Moreover, this filler is relatively inexpensive, is nonflammable and may be incorporated into inorganic resin cements in substantial quantities.

Wollastonite is a natural calcium silicate found in metamorphic rock. It exists primarily in fibrous form, the fibers generally being up to about one-eighth inch in length. Thus, this filler, too, falls within the general definition of microfibers and is capable of providing multidirectional reinforcement to the cellular inorganic resin cements of this invention.

As will be apparent from the diagram of FIG. 1, the point or points in the process at which the filler components including the microfibers and other filler materials may be added is at least in part determined by the type of blowing agent used. It may also be determined by such factors as viscosity of the foaming composition, the nature of the microfiber, whether or not fillers are added, their amount and character, and the final steps required to provide the desired final product.

This it will be seen that when a blowing agent which reacts or decomposes to provide gas is used, it is preferable to add the microfibers, as well as other fillers, to the reactant slurry prior to blending in the blowing agent. This may be done by adding the microfibers and/or fillers into the slurry tank and using slow-speed mixing, or by first transferring the slurry to a separate blender before the microfibers and/or fillers are added. Under some circumstances it may be found desirable initially to disperse the microfibers and/or fillers in the slurry with high-shear mixing prior to the slow-speed blending and addition of blowing agent. When using a blowing agent, such as a liquid fluorinated hydrocarbon, which vaporizes to provide gas, the microfibers and/or fillers are conveniently added to the reactant slurry along with the blowing agent. Again, these additions may be made to the slurry tank or to a separate blender to which the reactant slurry has been transferred. Alternatively, the filler component may be added before or after the vaporizable blowing agent is blended into the slurry. Fillers, other than microfibers, which are added to the foaming composition must be of a character which does not interfere with the cellular structure of the final product or cause the collapse of the foam. Thus, relatively long fibers are unsuitable for blending into the foaming composition.

The resulting foaming composition with filler component may then be transferred to an appropriate mold for curing with or without added heat and pressure. This foaming composition mixture may also be used in very low or low pressure matched-die molding, in pultrusion or in filament winding.

Since it is generally desirable to work with a foaming composition that is pourable, the viscosity of the composition may control the point of addition of the microfibers. Since the viscosity of the final foaming composition to be pourable is preferably no greater than about 100,000 centipoises, it may be desirable to add some or all of the microfibers during the formation of the final cellular structure. Thus, in the case of chopped glass greater than about ⅛ inch long, the direct introduction of the glass into the foaming composition generally gives rise to a very viscous material. However, by using a chopper gun in which the foamed composition and chopped glass are fed separately into a mold or onto a surface, it is possible to add the chopped glass microfibers into the foamed product.

Finally, the inclusion of fillers other than microfibers described below, may also influence the viscosity, as well as other physical characteristics of the foaming composition, and hence dictate the best point of addition of the microfibers. Thus the amount of inorganic reinforcing filler material added will depend upon the nature of the filler material and the flexural and tensile strengths desired. The maximum total quantity of filler component added prior to final formation of the cellular structure will be that which is less than the quantity which will cause the collapse of the foam. Preferably this quantity of filler will be no greater than that amount which will raise the viscosity of the foaming composition, prior to structural shaping, to about 100,000 centipoises. The optimum amount and type of filler material within these ranges will be that required to obtain predetermined desired tensile and flexural strengths.

In general, the microfiber filler in a cellular filled inorganic resin cement should be present in an amount ranging between about 2% and about 40% by weight of the cellular inorganic resin cement formed. A preferred amount of microfiber filler in the cellular product ranges from between about 5% and 20%.

The optimum amount of microfiber filler material within this range for any one composition also depends upon the nature of the microfiber material. Thus, if it is in very finely divided form and if it is readily wettable for easy dispersion throughout the foam structure, a greater amount may be added than if it is of larger size and less easily dispersed. This is illustrated in the data of Table 10. In formulating the foaming composition for the examples of Table 10, a gaging solution of 70% was used and the slurry made with it had an $MgCl_2 \cdot 6H_2O$ to $MgO$ molar ratio of 1 to 5. To this slurry were added 1% by weight of sodium hexametaphosphate, 2% by weight of a stearate (zinc or ammonium), 4% by weight of 30% concentration $H_2O_2$, $KMnO_4$ (0.005% by weight for all but the last four examples and 0.007% by weight for the last four), and an organic silicone (0.5% by weight in all but the last four examples; and 0.1% by weight in the last four examples). Various types of glass fibers, mineral fibers, and glass bubbles were added as additional fillers and reinforcing materials to this basic composition; and the densities and tensile strengths were determined for the final foamed products which were cured at ambient temperature.

It will be seen from the data of Table 10 that in those instances where milled glass fibers were used as the reinforcing filler material, a greater amount of the filler could be used than when chopped fibers are added. This difference is attributed to the presence of very fine particles created in the milling. Moreover, the water-bonded fibers, treated for the bonding of water-based materials, can be used in larger amounts than the starch-bonded or cationic-surfactant treated milled fibers. In the case of starch-bonded fibers it is believed that the starch coating on the fibers contributes to the viscosity of the foaming composition and that a level is reached where this starch increases the viscosity of the foaming composition to a point where foaming and further processing becomes difficult.

The character of the microfibers used has a similar effect on the foaming compositions formed using a fluorinated hydrocarbon blowing agent. This is illustrated in the data of Table 11. The basic slurry composition used was that used to obtain the data of Table 9 having 4% by slurry weight of $CCl_3F$ as the blowing agent.

Table 10

| | Effect of Inorganic Filler Materials on Properties of Cellular Product | | |
|---|---|---|---|
| | | Properties of Cellular Products | |
| Filler | % Filler by Slurry Wt. | Density lbs/ft$^3$ | Tensile Strength psi |
| ⅛" Water-bonded milled glass fibers | 0 | 23.9 | 26 |
| | 5.0 | 20.1 | 90 |
| | 6.0 | 23.9 | 90 |
| | 8.0 | 21.3 | 82 |

Table 10-continued

Effect of Inorganic Filler Materials on Properties of Cellular Product

| Filler | % Filler by Slurry Wt. | Density lbs/ft³ | Tensile Strength psi |
|---|---|---|---|
| | 10.0 | 23.4 | 130 |
| | 12.0 | 24.8 | 94 |
| | 14.0 | 25.7 | 112 |
| | 16.0 | 26.8 | 168 |
| | 16.0 | 24.4 | 144 |
| ⅛" Milled glass fibers with cationic surfactant | 10.0 | 24.4 | 152 |
| | 12.0 | 25.2 | 146 |
| | 16.0* | 29.6 | 162 |
| 1/16" Starch-bonded milled glass fibers | 10.0 | 23.2 | 109 |
| | 12.0 | 23.7 | 98 |
| | 16.0* | 29.2 | 166 |
| ⅛" Starch-bonded milled glass fibers | 10.0 | 25.3 | 132 |
| | 12.0 | 24.5 | 146 |
| | 16.0* | 24.4 | 158 |
| ¼" Chopped glass fibers with cationic surfactant | 4.0* | — | — |
| | 8.0* | — | — |
| | 16.0* | — | — |
| Mineral fibers, <¼" | 16.0 | 29.2 | 186 |
| Glass bubbles (2 mils dia.) | 5.0 | 24.2 | 118 |
| ⅛" water-bonded milled glass fibers | 5.0 | | |

*Too thick for pouring; could be molded like dough.

It will be seen from the data of Table 11 that in those instances where milled glass fibers are used as the reinforcing filler material, a greater amount of the filler may be used because of the presence of very fine materials. Moreover, when the milled glass is water-bonded or treated with a cationic surfactant, even more may be added than in the case where the glass is untreated because, as noted above, these surface treatments give rise to easy dispersibility.

Table 11

Effect of Inorganic Fillers on Cellular Properties

| Filler | % Filler by Slurry Wt. | % Blowing Agent by Wt. | Density lbs/ft³ | Tensile Strength psi |
|---|---|---|---|---|
| ⅛"-starch-bonded milled glass | 0.0 | 4 | 9.0 | 1 |
| | 8.0 | 4 | 11.2 | 6 |
| | 10.0 | 4* | 17.9 | 40 |
| | 0.0 | 2.5 | 15.6 | 12 |
| | 8.0 | 2.5 | 23.0 | 98 |
| ⅛" water-bonded milled glass | 16.0 | 4 | 16.5 | 56 |
| | 20.0 | 4 | 17.4 | 60 |
| ⅛" milled glass with cationic surfactant | 16.0 | 4 | 16.0 | 42 |
| | 20.0 | 4 | 17.8 | 53 |
| ¼" chopped fibers | 2.0 | 2.5 | 16.3 | 44 |
| | 4.0 | 2.5 | 25.4 | 52 |
| | 8.0 | 2.5* | | |

*These compositions were extremely thick and not acceptable for pouring; could be handled as dough.

Table 12 presents data which illustrate the effectiveness of asbestos mine tailings, wollastonite or a mixture of these fillers in increasing the flexural strength of cellular inorganic resin cements made in accordance with this invention. Except where specifically noted, the basic formula used in forming the reactant slurry the concentration of the MgCl₂.6H₂O in the gaging solution was about 66% by weight and the molar ratio of MgCl₂.6H₂O to MgO was 1 to 6. 2% zinc stearate was added as the surfactant and 1% sodium hexametaphosphate was used as the phosphate component. In those examples in which hydrogen peroxide was used as the blowing agent 0.007% KMnO₄ was added as a decomposition catalyst.

Table 12

Use of Asbestos Mine Tailings and Wollastonite as Fillers

| Filler* | % Filler by Slurry Wt. | Blowing Agent Used | Density lbs/ft³ | Flexural Strength psi |
|---|---|---|---|---|
| AMT | 10 | FHC | 27.5 | 58 |
| AMT | 15 | FHC** | 30 | 96 |
| AMT | 20 | H₂O₂ | 26 | 71 |
| Wol | 15 | FHC | 28 | 300 |
| AMT | 5 | | | |
| Wol⁺ | 5 | H₂O₂ | 28 | 126 |
| AMT | 5 | | | |
| Wol | 5 | H₂O₂ | 27 | 105 |
| AMT | 5 | | | |
| Wol | 5 | H₂O₂ | 27 | 141 |
| AMT | 5 | | | |
| Wol⁺⁺ | 5 | H₂O₂ | 28 | 167 |
| AMT | 10 | | | |
| Wol | 10 | H₂O₂ | 32 | 167 |
| AMT | 10 | | | |
| Wol | 5 | H₂O₂ | 28 | 168 |
| AMT | 15 | | | |
| Wol | 5 | H₂O₂ | 29 | 60 |

*AMT = asbestos mine tailings; Wol = wollastonite
**Fluorinated hydrocarbon, C Cl₃F
⁺MgCl₂ . 6H₂O/MgO = 1/5
⁺⁺MgCl₂ . 6H₂O/MgO = 1/5; H₃PO₄ used as phosphate component.

Although the above examples were all formulated using magnesium chloride, MgCl₂.6H₂O, as the magnesium salt, it will be apparent to those skilled in the art that magnesium sulfate MgSO₄.7H₂O, can be used in forming the foamed cellular inorganic resins of this invention. This is illustrated by the examples in Table 13. In both of these examples the water-soluble phosphate was 1% sodium hexametaphosphate, the hydrogen peroxide decomposition catalyst was 0.005% KMnO₄, the surfactant was 2% zinc stearate, the filler was 6% ⅛-inch water-bonded milled glass fibers and the blowing agent was 4% (30% concentration) H₂O₂, all by slurry weight.

Table 13

Use of MgCl₂·6H₂O and MgSO₄·7H₂O

| Mg Salt | % Conc. Gaging Solution | Molar Ratio Mg Salt/MgO | Slurry Viscosity Cps | Density lbs/ft³ | Tensile Strength psi |
|---|---|---|---|---|---|
| MgCl₂·6H₂O | 70 | 5/1 | 1,500 | 24.2 | 160 |
| MgSO₄·7H₂O | 65 | 6/1 | 10,000 | 30.5 | 88 |

Although the compositions of Table 13 contained microfibers as the filler component, cellular magnesium oxysulfates may also be formed without a filler component or with fillers other than microfibers.

Those fillers, other than the microfibers, which may be incorporated in the cellular product of this invention include, but are not limited to, longer fibers, i.e., greater than one-fourth inch, of such diverse materials as glass, asbestos and mineral wool in strand or woven mat form, synthetic resins in fiber or particulate form, and particulate fillers such as mica, talc, perlite, vermiculite, polystyrene beads, glass microballoons and the like. Some of these fillers, e.g., the longer fibers, may be added to impart increased strength to the solid filled product, while others, e.g., perlite, vermiculite, polystyrene beads or glass microballoons may be added primarily to decrease the density of the final product.

As shown in FIG. 1, it may be desirable to add at least a portion of such fillers, along with the microfibers, to the reactant slurry, so long as they do not interfere with the ability of the foaming composition to attain full volume before gelling or with the cellular structure of the final product. Thus, in most cases, it will be practical to add only the particulate fillers, along with the microfibers, to the foaming composition. The quantity of any one filler or combination of fillers added to the foaming composition may be governed by the fact that the consistency of the filled molding composition must be such as to permit its transfer to mold forms. In forming filled inorganic resin cements this means that it is even possible, although not always desirable, for the filled molding composition to have a consistency resembling dough. Preferably, for ease of handling, the filled molding composition is of a consistency which permits it to be poured into a mold.

The above-named fillers, as well as glass fiber mats which comprise a preferred class of fillers, may also be combined with the filled molding composition during the molding step. Such glass mats, now commercially available, may be of the nonwoven type formed from either continuous strands or chopped strands (typically about two inches in length) or of the woven type. These mats characteristically have weights from about one-half to two ounces or more per square foot. When fiber glass mats are used as the filler, the filled magnesium oxide cement compositions are formed as a fiber glass laminate by any of the techniques known in the art for the fabrication of such laminates with organic resins. Cure cycles will range from about 3 to 5 minutes in matched dies at 200° F. to 250° F. to 24 hours or more for ambient-temperature cures. Addition of fillers, other than glass fiber mats, during the molding step may be accomplished by such well-known techniques as hand lay-up or spray-up, the reactive slurry/microfiber blend and fillers being supplied through separate feeding means. The fillers can be added to control the processing characteristics (i.e., viscosity, thixotropy, etc.) of the filled composition as well as the physical properties of the final product.

In the step of molding, it may be desirable to form one or more surfaces of the final product in the form of a layer of resin cement/filler mixture having a different composition and/or ratio than the main body of the cellular filled product. As shown in the drawing, this may be done by using some of the reactant slurry having, for example, only long fibers as a filler to line the mold cavity in an appropriate manner to form the desired surface or surfaces of the molded product. In those cases wherein the filler component is added simultaneously with the blowing agent, the mold-lining composition may be made up by diverting an appropriate quantity of the reactant slurry and adding filler thereto as shown in FIG. 1.

It may also be desirable to apply some form of surface finish, e.g., a film or spray coat, or a layer of paper, metal or the like, to the molded product. This may be done by any suitable technique.

FIG. 2 illustrates in diagrammatic cross-section a cellular inorganic resin cement formed by the process of this invention. This FIG. 2 may be considered as somewhat of a composite article made up of a cellular body 10 formed into a predetermined configuration, an optional layer 11 of solid inorganic resin cement bonded during molding to selected surfaces of the cellular body 10, and an optional surface finish 12. Cellular body 10 is shown to comprise resin cement 13, cells 14 and microfibers 15; and layer 11 is shown to include a filler 16 such as glass fibers. As will be apparent from the above detailed description, the article of manufacture of this invention may be provided in a number of different embodiments, that in FIG. 2 being illustrative of but one class.

The molding techniques used in handling the filled foaming composition may be essentially the same as those used for the unfilled compositions with the addition, if desired, of additional fillers as described.

Although the foaming composition, with or without a filler component, may be cured at room temperature over an extended period of time, e.g., several days, it is preferable in commercial practice to use heat in curing it. The heat may be supplied in the form of infrared radiation, hot plattens, or hot gases, e.g., steam, air, and the like. The temperature at which this curing is carried out should be that which raises the temperature of the foamed structure to no greater than about 125° C. Exemplary of heat curing are retaining the mold with foaming composition in a heated air oven at 95° C., 125° C. or 155° C. for 60 minutes, exposing the material in a mold to a source of infrared radiation spaced 8 inches from the surface for 15 minutes; and heating foam panels in a platen press or a steam chamber to 105° C. for 15 minutes or to 120° C. for 13 to 15 minutes. Thus it will be seen from these examples that a wide variety of heat curing is possible. Table 14 gives typical densities and tensile strengths for oven curing at three different temperatures. The foaming formulations for the examples of Table 14 were made using a slurry formed of a 70% gaging solution having a molar ratio of $MgCl_2.6H_2O$ to MgO of 1 to 5, 4% (30% concentration) hydrogen peroxide, 1% sodium hexametaphosphate, 0.005% $KMnO_4$, 2% zinc stearate and 16% one-fourth inch water-bonded milled glass fibers by slurry weight.

Table 14

Effect of Heat Curing in Hot Air Oven on Properties of Cellular Product

| Curing Conditions | | Cellular Product Properties | |
| --- | --- | --- | --- |
| Temp., °C. | Time, Min. | Density lbs/ft³ | Tensile Strength psi |
| 94 | 60 | 19.5 | 70 |
| | | 20.2 | 69 |
| | | 20.5 | 74 |
| 110* | 60 | 20.5 | 80 |
| | | 20.5 | 83 |
| | | 20.5 | 78 |
| 110 | 60 | 10.6 | 74 |
| | | 20.1 | 76 |
| | | 20.1 | 77 |
| 154 | 60 | 18.0 | — |
| | | 24.0 | — |
| | | 33.0 | — |

*2% sodium hexametaphosphate.

The cellular inorganic resin cements of this invention may be distinguished and characterized by their physical properties. The cell structure is one in which the uniformity of the size of the cells throughout any one foam depends at least in part on the cell size, the degree of uniformity increasing with decreasing cell size. In those structures wherein the cells may be classed as large sized (e.g., having diameters greater than 3 mm)

the nonuniformity of the cell sizes limits the use of such structures to those applications, e.g., foamed-in-place insulation, wherein tensile and impact strengths are of secondary importance. In the case of structures wherein the cell diameters range from about 1.25 to 3 mm (cross sectional area from about 1 to 7 mm$^2$) the cells are substantially uniform in size; and in structures having the cells classed as fine (less than 1.25 mm in diameter and no greater than about 1 mm$^2$ in cross section) the cells are essentially all of uniform size. It is preferable that essentially all of the cells have cross sectional areas no greater than about 2 mm$^2$.

In the preferred embodiment of the cellular inorganic resin cements of this invention a portion, e.g., at least about 25%, of the cells are closed and contain moisture entrapped therein. Since some of the blowing agents used may have low coefficients of thermal conductivity, those foamed structures containing such blowing agents and having a large percentage of closed cells make excellent thermal insulation.

The density of the cellular product may range between about 5 and about 100 pounds per cubic foot, while a preferred density range is between about 15 and 50 pounds per cubic foot. As noted previously, the tensile strength may be controlled and may be varied from essentially zero for supported insulation up to as much as 100 pounds per square inch or greater. The ultimate use of the cellular product will, of course, dictate the desired strength. Since the concentrations of the gaging solution and the ratios of magnesium salt to MgO are chosen to provide a reaction system in which essentially all of the water of hydration and essentially all of the water added to form the slurry are consumed, the total amount of the microfiber and secondary filler material may range up to about 40% of the cured cellular product.

It will be seen from the above examples that the addition of microfiber fillers multidirectionally oriented throughout the cellular inorganic resin cement contributes significantly to the physical properties of this type of material. Of particular significance is the marked increase in tensile and flexural strengths realized when the microfibers are used along with an additional filler such as a glass mat. It is believed that in the latter case the microfiber fillers are able to transfer stresses through the inorganic resin cement matrix so that any load applied to such a cement is transmitted to a filler serving as a reinforcement. Thus it appears that through this mechanism the cellular inorganic resin cements may be effectively reinforced and made available for many uses heretofore not amenable to the use of unfilled material.

Finally, these cellular inorganic resin cements are water resistant and nonhygroscopic. They are nonflammable and exhibit essentially zero flame spread, zero smoke density and zero fuel contribution. For example, in flame spread tests the performance of the cellular product was equivalent to that of asbestos which has a zero rating; and it was determined to have a limiting oxygen index of greater than 95.

This invention thus includes novel foaming compositions and a novel process to provide cellular inorganic resin products which have unique properties that make them suitable for a wide range of applications due to the attainment of a wide range of densities, tensile strengths and other physical characteristics.

It will thus be seen that the objects set forth above, among those made apparent from the preceding description, are efficiently attained and, since certain changes may be made in carrying out the above process and in the composition and article set forth without departing from the scope of the invention, it is intended that all matter contained in the above description shall be interpreted as illustrative and not in a limiting sense.

We claim:

1. A process for forming a cellular inorganic resin cement, comprising the steps of
   (a) forming a reactant water slurry of a magnesium salt selected from magnesium chloride hexahydrate and magnesium sulfate heptahydrate, a water-soluble phosphate and reactive magnesium oxide, the amount of said magnesium salt ranging from about 50% to about 75% by weight of the total weight of said water and said magnesium salt, said slurry having a viscosity ranging between about 700 and 15,000 centipoises;
   (b) blending into said slurry at least 0.5% by slurry weight of an anionic water-repellent surfactant;
   (c) uniformly dispersing throughout said slurry a blowing agent, capable of providing a gaseous component either through decomposition or reaction or through vaporization at a temperature below that at which said inorganic resin cement is cured, in an amount required to form said cellular inorganic resin cement with a predetermined density, thereby to provide a foaming composition capable of attaining said predetermined density and final cell structure before said foaming composition gels to form said inorganic resin cement; and
   (d) curing said foaming composition under conditions to retain essentially all of its water content.

2. A process in accordance with claim 1 wherein the molar ratio of said magnesium chloride hexahydrate to said magnesium oxide is between about 1 to 3 and about 1 to 8 and of said magnesium sulfate heptahydrate to said magnesium oxide is between about 1 to 3 and about 1 to 14.

3. A process in accordance with claim 1 wherein the amount of said magnesium salt in said slurry ranges from about 60% to about 75% by weight of the total weight of said water and said magnesium salt.

4. A process in accordance with claim 1 wherein said magnesium salt is magnesium chloride hexahydrate and the molar ratio of said magnesium salt to said magnesium oxide is about 1 to 5.

5. A process in accordance with claim 1 wherein the viscosity of said slurry is between about 700 and 2500 centipoises.

6. A process in accordance with claim 1 wherein the amount of said surfactant ranges between about 0.5% and about 3% by slurry weight.

7. A process in accordance with claim 5 wherein said surfactant is stearic acid or an inorganic salt thereof.

8. A process in accordance with claim 1 wherein said blowing agent decomposes in the strongly alkaline slurry to provide said gaseous component.

9. A process in accordance with claim 8 wherein said blowing agent is hydrogen peroxide in an amount up to about 2.5% (100% concentration basis) by said slurry weight.

10. A process in accordance with claim 9 including the step of blending into said slurry, prior to the addition of said hydrogen peroxide, a catalyst for the decomposition of said hydrogen peroxide.

11. A process in accordance with claim 1 wherein said blowing agent is a liquid which vaporizes above ambient temperature to provide said gaseous component.

12. A process in accordance with claim 11 wherein said liquid blowing agent is trichlorofluoromethane in an amount up to about 8% by said slurry weight.

13. A process in accordance with claim 1 wherein said curing of said foaming composition is carried out at a temperature between ambient and about 250° C.

14. A process in accordance with claim 1 including the step of adding to said slurry a nucleating agent in an amount up to about 0.5% by said slurry weight.

15. A process in accordance with claim 1 including the step of forming said foaming composition into a predetermined configuration prior to said curing.

16. A process in accordance with claim 1 wherein said forming comprises molding with or without added heat and with or without added pressure.

17. A process in accordance with claim 1 including the step of incorporating a filler component into said cellular inorganic resin prior to said curing, the amount of said filler component being up to about 40% by weight of said cellular inorganic resin and less than that which will cause the collapse of said cellular inorganic resin.

18. A process in accordance with claim 17 wherein said filler component comprises at least in part microfibers up to about one-fourth inch in length.

19. A process in accordance with claim 18 wherein said microfibers comprise milled glass fibers.

20. A process in accordance with claim 18 wherein said microfibers comprise asbestos mine tailings.

21. A process in accordance with claim 18 wherein said microfibers comprise wollastonite fibers.

22. A process in accordance with claim 17 wherein said filler component comprises at least in part glass fibers longer than one-fourth inch.

23. A process in accordance with claim 22 wherein said glass fibers are in the form of a glass fiber mat.

24. A process in accordance with claim 17 wherein said filler component comprises at least in part a finely divided particulate material.

25. A process in accordance with claim 24 wherein said finely divided particulate material comprises mica, talc, perlite, vermiculite, polystyrene beads, glass microballoons or mixtures thereof.

26. A process in accordance with claim 17 wherein said step of incorporating said filler component comprises adding at least a portion of said filler component to said slurry, the amount of said filler component added to said slurry being no greater than that which raises the viscosity of said slurry to about 100,000 centipoises.

27. A process in accordance with claim 26 wherein said filler component is added to said slurry prior to dispersing said blowing agent throughout said slurry.

28. A process in accordance with claim 26 wherein said filler component is dispersed throughout said slurry with said blowing agent.

29. A process in accordance with claim 26 wherein said filler component comprises at least 50% by weight of microfibers ranging in length between about 1/32 inch and ¼ inch.

30. A process in accordance with claim 26 wherein said filler component comprises at least in part fibers longer than one-fourth inch or particulate material.

31. A process in accordance with claim 26 including the steps of forming said foaming composition into a predetermined configuration and adding at least a portion of said filler component to said foaming composition during said forming of said predetermined configuration.

32. A process in accordance with claim 31 wherein said filler component added during said forming comprises microfibers ranging in length between about 1/32 inch and ¼ inch.

33. A process in accordance with claim 31 wherein said filler component added during said forming comprises fibers longer than one-fourth inch or particulate material.

34. A process in accordance with claim 33 wherein said fibers added during said forming are glass and are provided as a glass fiber mat and said forming said predetermined configuration includes laminating said glass fiber mat with said foaming composition.

35. A process in accordance with claim 31 wherein said step of forming said predetermined configuration comprises molding said foaming composition within a mold cavity, said molding being performed with or without added heat and with or without added pressure.

36. A process in accordance with claim 35 including the step of lining said mold cavity with a mixture of a filler component and said reactant slurry without a blowing agent.

37. A process in accordance with claim 36 wherein said filler component in said mixture lining said mold cavity comprises fibers greater than one-fourth inch in length.

38. A process in accordance with claim 31 including the step of applying a surface finish to said predetermined configuration subsequent to curing said cellular inorganic resin cement.

39. A composition for forming a cellular inorganic resin cement, comprising in combination
 (a) a reactant water slurry of a magnesium salt selected from magnesium chloride hexahydrate and magnesium sulfate heptahydrate, reactive magnesium oxide and at least one water-soluble phosphate, said slurry having a viscosity ranging between about 700 and 15,000 centipoises and being one in which the solids concentration of said magnesium salt ranges between about 50% and about 70% by weight of the total weight of water of said slurry and said magnesium salt;
 (b) an anionic, water-repellent surfactant present in said slurry in an amount between about 0.5% and about 3% by slurry weight; and
 (c) a blowing agent, capable of providing a gaseous component either through decomposition or reaction or through vaporization in the strongly alkaline environment of said slurry, uniformly dispersed throughout said slurry and present in an amount required to form said cellular inorganic resin cement with a predetermined density, thereby to provide a foaming composition capable of attaining said predetermined density and final cell structure before said foaming composition gels to form said cellular inorganic resin cement and from which essentially no water is removed upon curing.

40. A composition in accordance with claim 39 wherein the molar ratio of said magnesium chloride hexahydrate to said magnesium oxide ranges between about 1 to 3 and about 1 to 8 and of said magnesium sulfate heptahydrate to said magnesium oxide between about 1 to 3 and about 1 to 14.

41. A composition in accordance with claim 39 wherein the amount of said magnesium salt in said slurry ranges from about 60% to about 75% by weight of the total weight of said water and said magnesium salt.

42. A composition in accordance with claim 39 wherein said magnesium salt is magnesium chloride hexahydrate and the molar ratio of said magnesium salt to said magnesium oxide is about 1 to 5.

43. A composition in accordance with claim 39 wherein the viscosity of said slurry is between about 700 and 2500 centipoises.

44. A composition in accordance with claim 39 wherein the amount of said surfactant ranges between about 0.5% and about 3% by slurry weight.

45. A composition in accordance with claim 44 wherein said surfactant is stearic acid or an inorganic salt thereof.

46. A composition in accordance with claim 39 wherein said blowing agent decomposes in the strongly alkaline slurry to provide said gaseous component.

47. A composition in accordance with claim 46 wherein said blowing agent is hydrogen peroxide in an amount up to about 2.5% (100% concentration basis) by said slurry weight.

48. A composition in accordance with claim 47 including a catalyst for the decomposition of said hydrogen peroxide.

49. A composition in accordance with claim 48 wherein said decomposition catalyst is potassium permanganate in an amount up to about 0.5% by said slurry weight.

50. A composition in accordance with claim 39 wherein said blowing agent is a liquid which vaporizes above ambient temperature to provide said gaseous component.

51. A composition in accordance with claim 50 wherein said liquid blowing agent is trichlorofluoromethane in an amount up to about 8% by said slurry weight.

52. A composition in accordance with claim 39 including a nucleating agent in an amount up to about 0.5% by said slurry weight.

53. A composition in accordance with claim 39 including a filler component present in an amount up to about 40% by said slurry weight, and less than that which will cause the collapse of the cellular inorganic resin formed from said composition, said composition being further characterized as having a viscosity no greater than about 100,000 centipoises.

54. A composition in accordance with claim 53 wherein said filler component comprises at least 50% by weight of microfibers ranging in length between about 1/32 inch and ¼ inch.

55. A composition in accordance with claim 54 wherein said microfibers comprise milled glass fibers.

56. A composition in accordance with claim 55 wherein said milled glass fibers are water-bonded.

57. A composition in accordance with claim 54 wherein said microfibers comprise mineral fibers.

58. A composition in accordance with claim 57 wherein said mineral fibers are asbestos mine tailings.

59. A composition in accordance with claim 57 wherein said mineral fibers are wollastonite fibers.

60. A composition in accordance with claim 53 wherein said filler component comprises at least in part fibers greater than one-fourth inch in length.

61. A composition in accordance with claim 53 wherein said filler component comprises a finely divided particulate material.

62. A composition in accordance with claim 61 wherein said finely divided particulate material comprises mica, talc, perlite, vermiculite, polystyrene beads, glass microballoons or mixtures thereof.

63. A cured cellular inorganic resin cement having essentially uniformly sized cells, a density ranging between about 5 and about 100 pounds per cubic foot and being further characterized as exhibiting essentially zero flame spread, zero smoke density and zero fuel contribution, said inorganic resin cement being the reaction product of reactive magnesium oxide and an aqueous, soluble phosphate-containing gaging solution of a magnesium salt selected from magnesium chloride hexahydrate and magnesium sulfate heptahydrate and having a concentration of said magnesium salt ranging between about 50% and about 75% by weight of said gaging solution, said reaction product being further characterized in that essentially all of the water of said gaging solution and the water of hydration of said magnesium salt are consumed in the reaction and contained in said inorganic resin cement.

64. A cellular inorganic resin cement in accordance with claim 63 wherein said cells have diameters up to about 3mm.

65. A cellular inorganic resin cement in accordance with claim 63 wherein the molar ratio of said magnesium chloride hexahydrate to said magnesium oxide ranges between about 1 to 3 and about 1 to 8 and of said magnesium sulfate heptahydrate to said magnesium oxide between about 1 to 3 and about 1 to 14.

66. A cellular inorganic resin cement in accordance with claim 63 including a filler component present in an amount up to about 40% by weight of said cement.

67. A cellular inorganic resin cement in accordance with claim 66 wherein said filler component comprises at least 50% by weight microfibers up to one-fourth inch long.

68. A cellular inorganic resin cement in accordance with claim 67 wherein said microfibers are glass.

69. A cellular inorganic resin cement in accordance with claim 67 wherein said microfibers are milled glass fibers.

70. A cellular inorganic resin cement in accordance with claim 69 wherein said milled glass fibers are water-bonded.

71. A cellular inorganic resin cement in accordance with claim 67 wherein said microfibers comprise mineral fibers.

72. A cellular inorganic resin cement in accordance with claim 71 wherein said mineral fibers are asbestos mine tailings.

73. A cellular inorganic resin cement in accordance with claim 61 wherein said mineral fibers are wollastonite fibers.

74. A cellular inorganic resin cement in accordance with claim 66 wherein said filler component comprises at least in part long fibers greater than one-fourth inch in length.

75. A cellular inorganic resin cement in accordance with claim 74 wherein said long fibers are glass in the form of a woven or nonwoven mat.

76. A cellular inorganic resin cement in accordance with claim 75 wherein said cellular inorganic resin cement is formed as a cellular cement/glass fiber laminate.

77. A cellular inorganic resin cement in accordance with claim 76 wherein said cellular cement of said laminate contains microfibers distributed therethrough.

78. A cellular inorganic resin cement in accordance with claim 66 further characterized as being formed into a predetermined configuration.

79. A cellular inorganic resin cement in accordance with claim 78 wherein selected surfaces of said predetermined configuration have bonded thereto said inorganic resin cement in noncellular form.

80. A cellular inorganic resin cement in accordance with claim 79 wherein said noncellular inorganic resin cement has a filler component incorporated therein.

81. A cellular inorganic resin cement in accordance with claim 80 wherein said filler component comprises fibers greater than one-fourth inch in length.

82. A cellular inorganic resin cement in accordance with claim 78 including a surface finish.

* * * * *